United States Patent [19]

Goell et al.

[11] 4,198,223
[45] Apr. 15, 1980

[54] CONTINUOUS FIBER FABRICATION PROCESS

[75] Inventors: James E. Goell; Mokhtar S. Maklad, both of Roanoke, Va.

[73] Assignee: International Telephone and Telegraph Corporation, New York, N.Y.

[21] Appl. No.: 797,722

[22] Filed: May 17, 1977

[51] Int. Cl.² .................... C03B 37/02; C03C 13/00; C03C 25/02
[52] U.S. Cl. ........................ 65/3 A; 65/121
[58] Field of Search ................ 65/DIG. 7, 374 R, 24, 65/26, 121, 32, 65/89, 65/3 A; 117/163, 167; 264/1, 81; 118/723, 725, 730

[56] References Cited

U.S. PATENT DOCUMENTS

| | | | |
|---|---|---|---|
| 1,218,598 | 3/1917 | Danner | 65/89 |
| 1,530,728 | 3/1925 | Kucera | 65/89 X |
| 1,628,417 | 5/1927 | Miller | 65/23 X |
| 2,992,517 | 7/1961 | Hicks, Jr. | 65/DIG. 7 |
| 3,025,146 | 3/1962 | Runyan | 65/26 X |
| 3,540,870 | 11/1970 | Li | 65/DIG. 7 |
| 3,725,023 | 4/1973 | Parris | 65/32 X |
| 3,737,292 | 6/1973 | Keck et al. | 65/3 A |
| 3,806,570 | 4/1974 | Flamenbaum et al. | 264/332 X |
| 3,823,995 | 7/1974 | Carpenter | 65/121 X |
| 3,932,162 | 1/1976 | Blankenship | 65/3 A |
| 3,933,453 | 11/1976 | Burke et al. | 65/DIG. 7 |
| 3,957,474 | 5/1976 | Kubayashi et al. | 65/DIG. 7 |
| 4,061,484 | 12/1977 | Aulich et al. | 65/3 A X |
| 4,062,665 | 12/1977 | Izawa et al. | 65/3 A |
| 4,065,280 | 12/1977 | Kau et al. | 65/3 A |

FOREIGN PATENT DOCUMENTS 2415052 10/1975 Fed. Rep. of Germany ........... 65/3 A

*Primary Examiner*—Richard V. Fisher
*Attorney, Agent, or Firm*—John T. O'Halloran; Peter C. Van Der Sluys

[57] ABSTRACT

A method of forming optical fibers in a continuous manufacturing process employs a heated mandrel with a predetermined taper at one end. Glass forming materials are applied to the mandrel by chemical vapor deposition along the taper to provide a corresponding glass concentration gradient along the taper. The molten glass materials are drawn in a continuous process without an intermediate preform stage.

14 Claims, 4 Drawing Figures

U.S. Patent
Apr. 15, 1980
4,198,223
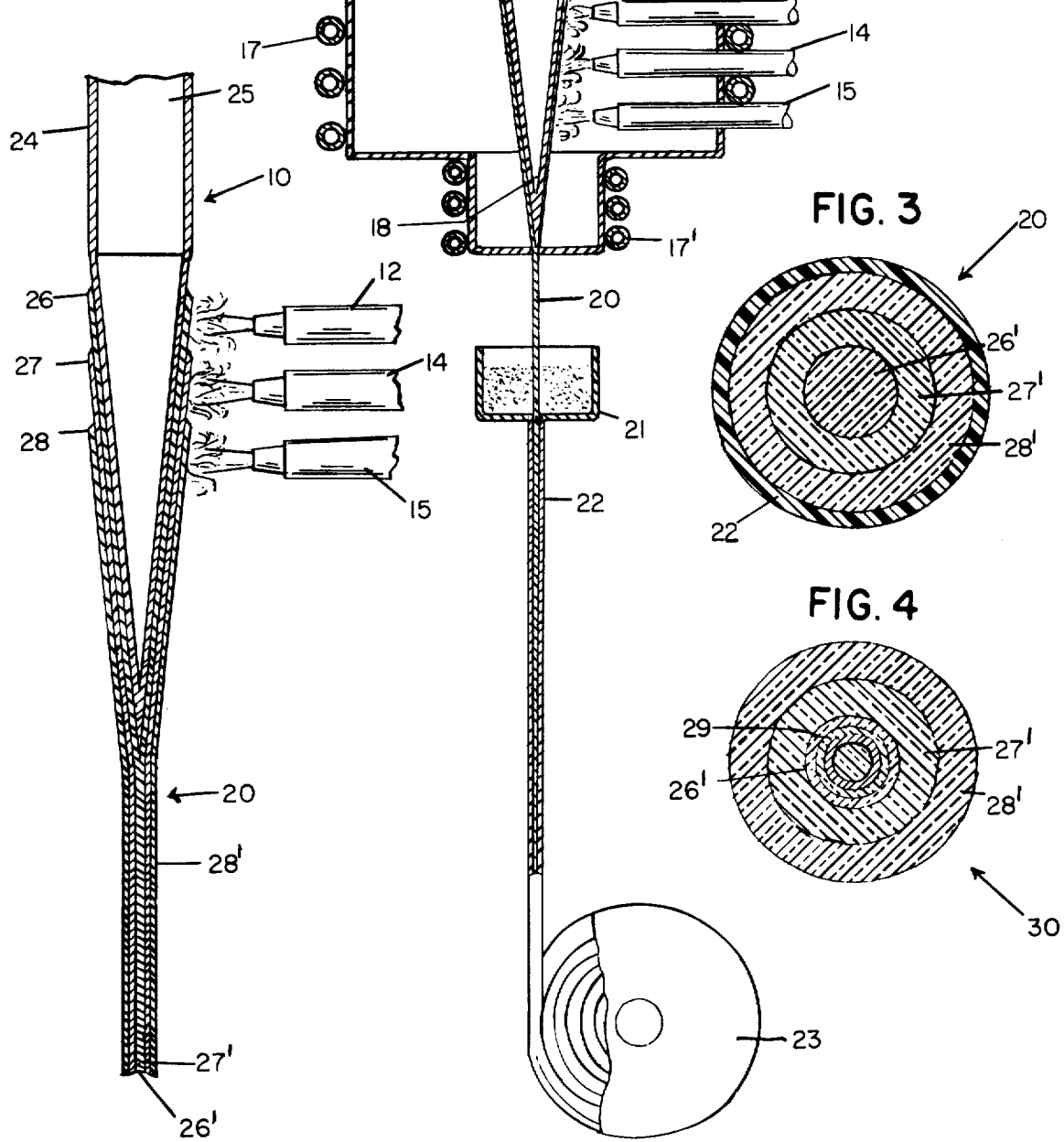

CONTINUOUS FIBER FABRICATION PROCESS

BACKGROUND OF THE INVENTION

Various methods are proposed for manufacturing optical fiber glass in a continuous process. The method proposed in U.S. Pat. No. 3,957,474 involves the deposition of the glass forming ingredients on a heated mandrel to form a fiber optic preform. The solid preform is then placed in a drawing tower and is heated and drawn into an optical fiber.

The method described in U.S. Pat. No. 3,614,197 uses a multi-stepped funnel-shaped heating vessel to form a solid glass rod which is subsequently heated and drawn into an optical fiber.

U.S. Pat. application Ser. No. 751,282 filed Dec. 16, 1976 now U.S. Pat. No. 4,065,280 improves over the heated mandrel and multiple crucible process by providing for the continuous fiber manufacture without the need for first forming a fiber optic preform.

This invention improves over prior art continuous fiber drawing processes by the use of plasma torches and a heated rotatable mandrel to greatly increase the speed of the fiber deposition and drawing processes.

SUMMARY OF THE INVENTION

Glassy oxides are deposited on a heated mandrel using vapor phase oxidation of the glass components. The degree of taper and the rotation rate of the mandrel provides for a gradient of material compositions to effect a step or graded index optical fiber. Plasma torches ensure that the glass components fuse upon deposit and induction heating and/or a high temperature laser beam maintains the mandrel tip at the optimum fiber drawing temperature.

BRIEF DESCRIPTION OF THE DRAWINGS

FIG. 1 is a sectional view of the apparatus employed for forming the inventive fiber according to the invention;

FIG. 2 is an enlarged sectional view of the deposition mandrel of the apparatus of FIG. 1;

FIG. 3 is a cross section of an optical fiber formed by the apparatus of FIG. 1; and FIG. 4 is a cross section of an alternate embodiment of an optical fiber formed by the apparatus of FIG. 1.

DESCRIPTION OF THE PREFERRED EMBODIMENT

FIG. 1 is one apparatus for carrying out the method of this invention. A rotating tapered mandrel 10 is enclosed within a deposition chamber 11 containing a plurality of deposition nozzles 12-15 for depositing the various glass materials and an exhaust 16 for removing the gaseous by-products. The mandrel 10 is heated by a plurality of RF coils 17 surround the enclosure 11. The tip 18 of the mandrel 10 is heated by separate RF coils 17' to heat the deposited materials to their melting temperature. The deposition nozzles 12-15 are located relative to the taper of the mandrel 10 so that core materials are deposited furthest from the mandrel point 18 whereas the cladding and outer layer materials are deposited respectfully at closer distances to the mandrel tip 18. This assures that the core material is innermost within the fiber and the cladding material is sandwiched with a glass outermost layer which protects the core and cladding in the drawn fiber 20.

The main RF heating coils 17 are adjusted to heat the mandril 10 at a temperature sufficient to cause the materials to melt upon deposit and the auxiliary RF coils 17' are adjusted to an optimum to create a suitable temperature for drawing a particular glass composition. Auxiliary heating can also be achieved by means of a high power laser.

The plastic coating applicator 21 is located immediately subjacent the mandrel tip 18 to insure that the fiber 20 immediately becomes coated with a plastic material 22 to keep airborne dust particles from gathering on the fiber surface 20.

The fiber drawing drum 23 is adjusted in speed to pull the glass materials into a continuous fiber 20 at a rate directly proportional to the rate of deposition of the glass forming materials upon the mandrel.

The materials used for forming the optical fiber core comprise a mixture of germanium and silicon chlorides which coat the region furthest from the mandrel tip 18 and is deposited by nozzle 12. The materials used for forming the cladding comprise a mixture of boron and silicon chlorides which mixture is deposited from nozzle 14 next closest to the mandrel tip 18 and the material used for forming the outermost layer is generally silicon tetrachloride and is deposited therefore at nozzle 15 closest to the tip 18 of the mandrel 10.

The mandrel 10 is kept rotating during the deposition process to insure both uniform heating and uniform deposition within the enclosure The material of the mandrel 10 comprises a platinum layer on a high temperature graphite rod 25. Alternatively, it can be platinum or a platinum alloy. The mandrel 10 provides a susceptor for receiving RF heating from RF coils 17. The platinum coating 24 for the compound susceptor prevents the glass materials from reacting with the mandrel 10. The degree of taper of the mandrel 10 determines the relative thickness of the corresponding core, cladding and outermost layers.

FIG. 2 is an enlarged view of the mandrel 10 of FIG. 1 containing the platinum layer 24 on the graphite rod 25 and showing the first deposition torch 12 as a plasma torch depositing the core material layer 26. The second plasma torch 14 deposits the cladding materal layer 27, and the third plasma torch 15 deposits the outermost layer 28. The heated mandrel 10 ensures that the materials 26-28 will melt and flow on contact to form a continuous fiber 20 having the respective core 26', cladding 27' and outer layer 28'.

The resulting cross section of the fiber 20 of FIGS. 1 and 2 is shown at FIG. 3 where the innermost material 26 comprises the core 26' of the fiber 20 and the cladding material 27 and the outermost material 28 comprise the cladding layer 27' and outermost layers 28' respectively.

FIG. 3 shows a cross section of the optical fiber 20 having an innermost core 26' and intermediate cladding 27' and an outermost layer of silica 28'. The plastic jacket layer 22 covers the entire fiber 20 to protect the fiber 20 from atmospheric affects and mechanical damage.

When a graded index type optical fiber having a variation in refractive index decreasing outwardly from the core to the cladding is desired, a fiber having the configuration of FIG. 4 can be conveniently made by the method of this invention. The graded index fiber 30 has a core 26' consisting of a plurality of concentric rings or regions 29 of decreasing index of refraction varying outwardly from the center. The cladding 27' and the outer layer 28' are made in the manner described earlier for the optical fiber 20 of FIG. 3. In order to provide graded index core 26', additional deposition nozzles such as 13 of FIG. 1 are employed for simultaneously depositing germania-silica material having decreasing concentrations of germania. Any number of added deposition nozzles 13 can be employed depending upon the degree of variation in the refractive index of the core 26'.

The unique deposition mandrel 10 of FIGS. 1 and 2 differs from the prior art devices as described earlier since the mandrel material does not become part of the finished optical fiber 20. The carbon and/or platinum material are used as a susceptor for the enclosing radio frequency coils 17 to ensure that the materials as deposited will immediately melt and flow in the direction of the taper of the mandrel 10. The auxillary radio frequency coils 17' enclosing the mandrel tip 18 ensure that the mandrel tip will be heated to the optimum temperature of the deposited materials to ensure that the materials can be readily drawn into the optical fiber 20.

The deposition nozzles 12–15 of FIG. 1 are disclosed as plasma torches for the purpose of this embodiment although other means of deposition of chemical materials in vapor form can also be employed. The coating 24 for the graphite material 25 is chosen as platinum since the platinum allows the materials to melt without chemically reacting with the platinum substrate.

We claim:

1. A method for forming a multi-component glass optical fiber, comprising the steps of:
   providing a high temperature refractory mandrel having an outer surface tapered to a tip at one end;
   positioning said mandrel substantially vertically with the tapered end disposed downwardly;
   continuously rotating said mandrel while maintaining it stationary in the vertical direction;
   continuously and simultaneously subjecting said outer surface of the mandrel to a plurality of glass forming components in chemical vapor form utilizing a plurality of deposition nozzles;
   continuously forming multi-component glass on said mandrel;
   continuously melting the glass on said mandrel by heating the mandrel to the melting temperature of the glass;
   flowing the melted glass downwardly over the mandrel towards the tip of the tapered end; and
   continuously drawing said melted glass in a downwardly and substantially vertical direction from the tip of the tapered end of said mandrel while continuously forming and melting glass on said mandrel, whereby a continuous optical fiber is formed.

2. The method of claim 1 wherein said step of heating the mandrel comprises subjecting the mandrel to a radio frequency field 3. The method of claim 1 wherein the deposition nozzles comprise plasma torches.

4. The method of claim 1 wherein the glass forming components have different indices of refraction, each component being deposited by a separate deposition nozzle.

5. The method of claim 4 wherein the step of subjecting said mandrel to a plurality of glass forming components comprises the step of discharging the components from the deposition nozzles at different vertical positions on the mandrel in order of decreasing refractive index with the lowest refractive index component closest to the tip of the tapered mandrel end.

6. The method of claim 5 wherein the glass forming component having the highest index of refraction is discharged furthest from said tip of the tapered end.

7. The method of claim 6 wherein the glass forming components comprise germanium silicate and wherein the component discharged closest to the tip of the tapered end of the mandrel has the lowest concentration of germania.

8. The method of claim 7 wherein the glass forming component discharged furthest from the tip of the tapered end has the highest concentration of germania.

9. The method of claim 1 additionally comprising the step of heating the melted glass at the tip of the tapered end of the mandrel to the optimum drawing temperature for the multi-component glass.

10. The method of claim 9 wherein the glass at the tip of the tapered end is heated by a gas laser.

11. The method of claim 1 wherein the mandrel material is selected to include carbon and the step of heating the mandrel includes subjecting it to a radio frequency field whereby the mandrel becomes a source of heat.

12. The method of claim 1 wherein the mandrel material is selected to include platinum and the step of heating the mandrel includes subjecting it to a radio frequency field whereby the mandrel becomes a source of heat.

13. The method of claim 6 wherein the glass forming component discharged furthest from the tip of the mandrel tapered end comprises germania silicate and the glass forming component discharged closest to said tip comprises borosilicate.

14. The method of claim 1, wherein the mandrel material is selected to include graphite with a platinum coating and the step of heating the mandrel includes subjecting it to a radio frequency field, whereby the mandrel becomes a heat source.

* * * * *